US008364358B2

(12) United States Patent
Ishikawa et al.

(10) Patent No.: US 8,364,358 B2
(45) Date of Patent: Jan. 29, 2013

(54) VEHICLE CONTROL UNIT AND VEHICLE EQUIPPED WITH THE SAME

(75) Inventors: Naoki Ishikawa, Sagamihara (JP); Katsumi Ueda, Sagamihara (JP); Masanobu Seki, Sagamihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 25 days.

(21) Appl. No.: 12/375,613

(22) PCT Filed: Jul. 22, 2008

(86) PCT No.: PCT/JP2008/063478
§ 371 (c)(1), (2), (4) Date: Jun. 11, 2010

(87) PCT Pub. No.: WO2009/107257
PCT Pub. Date: Sep. 3, 2009

(65) Prior Publication Data
US 2010/0332093 A1 Dec. 30, 2010

(30) Foreign Application Priority Data

Feb. 28, 2008 (JP) .................................. 2008-048834

(51) Int. Cl.
*G06F 17/00* (2006.01)
*H02P 17/00* (2006.01)
(52) U.S. Cl. ............................................ 701/51; 477/15
(58) Field of Classification Search .................... 701/22, 701/48, 51, 59, 54, 56; 477/120, 110, 107, 477/115, 108, 77, 45, 46, 79, 109, 160, 70, 477/98, 143, 44, 138, 15; 475/127, 120; 74/335, 473.26, 473.22
See application file for complete search history.

(56) References Cited

U.S. PATENT DOCUMENTS

| 6,016,456 A * | 1/2000 | Yu ................................... 701/55 |
| 2003/0203790 A1 | 10/2003 | Matsubara et al. |
| 2007/0087874 A1 * | 4/2007 | Kobayashi et al. ............. 474/46 |
| 2007/0283779 A1 * | 12/2007 | Hiroi et al. .................... 74/473.1 |
| 2008/0190703 A1 * | 8/2008 | Kato et al. .................... 187/224 |

FOREIGN PATENT DOCUMENTS

| JP | 60-4433 A | 1/1985 |
| JP | 61-105228 A | 5/1986 |

(Continued)

OTHER PUBLICATIONS

Chinese Office Action issued in Chinese Patent Application No. 200880000482.3 on Jun. 4, 2012.

*Primary Examiner* — James Trammell
*Assistant Examiner* — Muhammad Shafi
(74) *Attorney, Agent, or Firm* — Birch, Stewart, Kolasch & Birch, LLP (57) ABSTRACT

In a vehicle control unit for controlling a vehicle based on a detection signal obtained from a shift range detecting unit that detects a shift range selected by a shift operating unit, a vehicle speed detecting unit that detects a vehicle speed, and an engine rpm detecting unit that detects an engine rpm, when the detected vehicle speed is less than a reference vehicle speed, the shift range detecting unit detects that a shift switching operation is carried out from a neutral to a forward range or a reverse range, and the engine rpm detecting unit detects that the engine rpm is not less than a predetermined value until a time not less than a predetermined time is elapsed from when the shift switching operation is detected, a control for prohibiting a shift change of a transmission in accordance with the shift switching operation is carried out.

8 Claims, 7 Drawing Sheets

FOREIGN PATENT DOCUMENTS

| | | |
|---|---|---|
| JP | 5-141530 A | 6/1993 |
| JP | 5-69734 B2 | 10/1993 |
| JP | 2877252 B2 | 1/1999 |
| JP | 2002-61742 A | 2/2002 |
| JP | 2002-114495 A | 4/2002 |
| JP | 2003-322249 A | 11/2003 |
| JP | 2004-60803 A | 2/2004 |

* cited by examiner

VEHICLE CONTROL UNIT AND VEHICLE EQUIPPED WITH THE SAME

BACKGROUND OF THE INVENTION

1. Field of the Invention

The present invention relates to a vehicle control unit, having a function of preventing a breakdown of a vehicle caused by an operator's erroneous operation in a vehicle stop state, and a vehicle equipped with the vehicle control unit, and more particularly, to a vehicle control unit suitable for an industrial vehicle and a vehicle equipped with the vehicle control unit.

2. Description of the Related Art

Generally, in a vehicle, a driving force of an engine is transmitted to a transmission via a torque converter, and is transmitted to a drive wheel via one of a forward clutch and a reverse clutch received in the transmission, thereby allowing the vehicle to be in a traveling mode. The forward clutch and the reverse clutch are selected by a shift lever used to perform a forward/reverse switching operation.

A control system of a general automatic transmission includes a forward solenoid and a reverse solenoid of an electromagnetic switching valve for controlling a drive mechanism involved with a forward/reverse operation of a shift vehicle; and a control device for controlling the forward and reverse solenoids, wherein an operator selects a shift position by operating a shift lever provided in a driver seat, and the solenoids are controlled to be turned on or off on the basis of the shift position of the shift lever detected by a control unit, thereby realizing the speed stages such as a neutral, a forward/reverse, and plural speed stages.

In such a vehicle, it is desirable that the operator operates an accelerator pedal after performing a shift operation from the neutral to the forward or the reverse upon carrying out a departure operation. However, when the operator erroneously operates the accelerator pedal before the shift operation, a problem may arise in that an engine rpm increases (for example, the accelerator pedal pressing operation and the shift change operation are simultaneously carried out in a vehicle stop state). In this case, when a transmission gear is engaged in accordance with the erroneous shift operation, a problem may arise in that a transmission, an axle, or the like is broken down due to a large shock.

Patent Document 1 (Japanese Patent No. 2877252) discloses a device for preventing a sudden departure caused by an operator's erroneous operation. This device allows a control unit to output a transmission signal to a hydraulic control valve for performing a clutch switching operation on the basis a position selector signal for indicating an operator's position selection, a cutoff signal for indicating a cutoff state, an engine rpm, and a vehicle speed. Accordingly, when the vehicle travels at a vehicle speed not more than a predetermined vehicle speed in a state where the transmission is located at a neutral and the engine is at a high rpm, it is possible to prevent a case in which the vehicle shoots off due to a clutch engagement in accordance with the operator's erroneous operation.

As described above, in the vehicle stop state, when the operator carries out the erroneous operation in which the engine rpm increases at the same timing as the shift operation or at a timing just before or after the shift operation upon carrying out the departure operation, a problem may arise in that the transmission, the axle, or the like is broken down due to a large shock. Particularly, in an industrial vehicle represented as a cargo handling machine such as a forklift or a reach stacker and a construction machine such as a motor grader, a bulldozer, or a wheel loader, the forward/reverse switching operation is frequently repeated since the driving operation is carried out in many cases during a work, and thus the operator's erroneous operation may easily occur. For this reason, a vehicle for preventing the problem has been strongly demanded.

SUMMARY OF THE INVENTION

Therefore, the present invention is contrived in consideration of the above-described problems, and an object of the invention is to provide a vehicle control unit and a vehicle equipped with the vehicle control unit, the vehicle control unit being capable of preventing a breakdown of a vehicle caused by an erroneous operation in which an engine rpm increases at the same timing as a shift operation or a timing just before or after the shift operation upon carrying out a departure operation.

According to an aspect of the invention, there is provided a vehicle control unit for controlling a vehicle on the basis of a detection signal obtained from a shift range detecting unit configured to detect a shift range selected by a shift operating unit, a vehicle speed detecting unit configured to detect a vehicle speed, and an engine rpm detecting unit configured to directly or indirectly detect an engine rpm, wherein when the vehicle speed detecting unit detects that a vehicle speed Vi is less than a reference vehicle speed $V_0$ ($V_0 > Vi \geqq 0$ (km/h)), the shift range detecting unit detects that a shift switching operation is carried out from a neutral to a forward range or a reverse range, and then the engine rpm detecting unit detects that the engine rpm is not less than a predetermined value $R_1$ until a time not less than a predetermined time t is elapsed from a time point when the shift switching operation is detected, a control for prohibiting a shift change of a transmission in accordance with the shift switching operation is carried out.

According to the invention, it is possible to prevent the breakdown of the vehicle by prohibiting the shift change caused by the erroneous operation of the shift lever upon carrying out the departure operation. That is, in a case where the shift switching operation causing a large load is carried out at a high engine rpm upon carrying out the departure operation, it is possible to prevent a high shock from being applied to the transmission, the front axle, or the like by carrying out a control for prohibiting the shift change of the transmission. Additionally, since it is possible to determine the vehicle stop state on the basis of the vehicle speed, such functions are configured to be carried out only in the vehicle stop state, thereby accurately preventing inconvenience upon carrying out the departure operation. Further, according to the invention, since the predetermined time t is set in advance by the control unit and the shift change is prohibited within the predetermined time t even when the accelerator pedal is operated, the accelerator pedal operation is just carried out in an idle rotation state. Accordingly, it is possible to allow the operator to be accustomed to operate the accelerator pedal after a predetermined time from the operator's shift operation, and thus to reliably prevent the breakdown of the vehicle.

Further, in the invention, when the engine rpm detecting unit detects that the engine rpm is not more than a predetermined value $R_2$ during the prohibiting control, the prohibiting control may be canceled and the shift change in accordance with the shift switching operation may be carried out.

Accordingly, since the shift change is permitted to engage the gear at a time point when the engine rpm sufficiently decreases, it is possible to prevent a large load from being applied to the vehicle and to carry out a control in accordance with the operator's operation.

Further, in the invention, the predetermined value $R_1$ as a control starting condition of the prohibiting control and the predetermined value $R_2$ as a control canceling condition of the prohibiting control may be set to be different from each other, and the predetermined value $R_2$ may be smaller than the predetermined value $R_1$. Accordingly, it is possible to carry out a stable driving by preventing hunting.

Further, an alarm unit may be operated to generate an alarm toward an operator during the prohibiting control. Likewise, since the alarm is generated to inform the shift change prohibiting state in accordance with the erroneous operation or an action to be carried out by the operator for canceling the prohibiting control, it is possible for the operator or the third person in the vicinity of the vehicle to accurately check the vehicle state, and thus to promptly carry out the appropriate driving operation.

Further, a control signal for compulsorily decreasing the engine rpm to be not more than the predetermined value $R_2$ may be transmitted to an engine rpm control unit provided in the vehicle during the prohibiting control. In the invention, the engine rpm control unit is a unit for controlling an engine rpm of an engine throttle control proportional valve or the like. The engine rpm is controlled by controlling a fuel amount in such a manner that current supply to the proportional valve is controlled and an opening degree of the proportional valve is controlled. According to the invention, it is possible to reduce a time until the control corresponding to the shift switching operation is carried out, and thus to carry out the prompt driving control.

Additionally, a first control data table may have an engine rpm time-series control pattern set in advance to compulsorily decrease the engine rpm during the prohibiting control, and the engine rpm may be controlled to decrease in accordance with the first control data table during the prohibiting control.

According to the invention, since the engine rpm decreases in accordance with the first control data table set in advance, it is possible to decrease the engine rpm so as to reduce a load applied to the vehicle.

Further, a second control data table may have an engine rpm time-series control pattern after a prohibiting control canceling timing set in advance; and when the engine rpm corresponding to an accelerator pedal opening degree (pressing amount) operated by the operator after the prohibiting control canceling timing is larger than the engine rpm set in the second control data table, the engine rpm may be controlled to be equal to the engine rpm set in the second data table; and when the engine rpm corresponding to the accelerator pedal opening degree operated by the operator after the prohibiting control canceling timing is not more than the engine rpm set in the second control data table, the engine rpm may be controlled to be equal to the engine rpm corresponding to the accelerator pedal opening degree operated by the operator.

According to the invention, since it is possible to control the vehicle at the appropriate engine rpm after canceling the prohibiting control, it is possible to reduce a load applied to the vehicle and to ensure a stable driving. For example, when the prohibiting control is directly canceled in a state where the operator's accelerator pedal opening degree is large, the gear is engaged in a state where the accelerator pedal opening degree is large and the accelerator pedal operation is permitted. Accordingly, in a case where the engine rpm is larger than the second control data table set in advance, it is possible to move to a normal driving state in a stable manner without deteriorating a driving feeling by controlling the engine rpm on the basis of the second control data table. On the other hand, in a case where the engine rpm corresponding to the accelerator pedal opening degree is not more than that of the second control data table, since it is possible to ensure the safety and the driving feeling without carrying out the above-described control, the control in accordance with the operator's operation is carried out.

Further, the vehicle according to the invention is the vehicle equipped with the vehicle control unit. Accordingly, it is possible to provide the vehicle having high durability and reliability without the inconvenience or the breakdown caused by the operator's erroneous operation.

As described above, according to the invention, it is possible to prevent the breakdown of the vehicle by ignoring the shift change in accordance with the erroneous operation of the shift lever upon carrying out the departure operation. Particularly, it is possible to allow the operator to be accustomed to operate the accelerator pedal after a predetermined time from the operator's shift operation. Additionally, it is possible for the operator to keep a smooth driving feeling even when the above-described erroneous operation is carried out.

That is, in a case where the shift switching operation causing a large load is carried out at a high engine rpm upon carrying out the departure operation, it is possible to prevent a high shock from being applied to the transmission, the front axle, or the like by carrying out a control for prohibiting the shift change of the transmission. Additionally, since it is possible to determine the vehicle stop state on the basis of the vehicle speed, such functions are configured to be carried out only in the vehicle stop state, thereby accurately preventing inconvenience upon carrying out the departure operation.

Additionally, according to the invention, since the predetermined time t is set in advance and the shift change is prohibited within the predetermined time t even when the accelerator pedal is operated, it is possible to allow the operator to be accustomed to operate the accelerator pedal after a predetermined time from the operator's shift operation, thereby reliably preventing the breakdown of the vehicle.

Further, since it is possible to carry out the gear engagement at a time point when the engine rpm sufficiently decreases in such a manner that the above-described control is canceled and the switching operation of the transmission is carried out in accordance with the shift change in a case where the engine rpm is not more than a predetermined engine rpm, it is possible to prevent a large load from being applied to the vehicle and to carry out a control in accordance with the operator's operation.

Furthermore, since the predetermined value $R_1$ as the control starting condition of the prohibiting control and the predetermined value $R_2$ as the control canceling condition of the prohibiting control are set to be different from each other, and the predetermined value $R_2$ is smaller than the predetermined value $R_1$, it is possible to carry out the stable driving by preventing hunting.

Moreover, since the alarm signal is generated when the erroneous operation is carried out, it is possible for the operator or the third person in the vicinity of the vehicle to accurately check the vehicle state, and thus to promptly carry out the appropriate driving operation.

Additionally, since the first control data table has the engine rpm time-series control pattern set in advance to compulsorily decrease the engine rpm during the prohibiting control, and the engine rpm is controlled to decrease in accordance with the first control data table during the prohibiting control, it is possible to decrease the engine rpm so as to reduce a load applied to the vehicle.

Further, the second control data table has the engine rpm time-series control pattern after the prohibiting control canceling timing set in advance; and when the engine rpm after the prohibiting control canceling timing is larger than the engine rpm set in the second control data table, the engine rpm is controlled to be equal to the engine rpm set in the second data table; and when the engine rpm after the prohibiting control canceling timing is not more than the engine rpm set in the second control data table, the engine rpm is controlled to be equal to the engine rpm corresponding to the accelerator pedal opening degree operated by the operator. Accordingly, it is possible to control the vehicle at the appropriate engine rpm after canceling the prohibiting control. Therefore, it is possible to reduce the load applied to the vehicle and to ensure the stable driving.

Furthermore, since the vehicle is equipped with the vehicle control unit, it is possible to provide the vehicle having high durability and reliability without the inconvenience or the breakdown caused by the operator's erroneous operation.

DETAILED DESCRIPTION OF THE INVENTION

Hereinafter, an exemplary embodiment of the invention will be described in detail with reference to the accompanying drawings. Here, although the dimension, the material, the shape, the relative arrangement, and the like of the component are described in the embodiment, the scope of the invention is not limited thereto so long as a particular description is not made, but those are only examples for a description.

Figure 1:
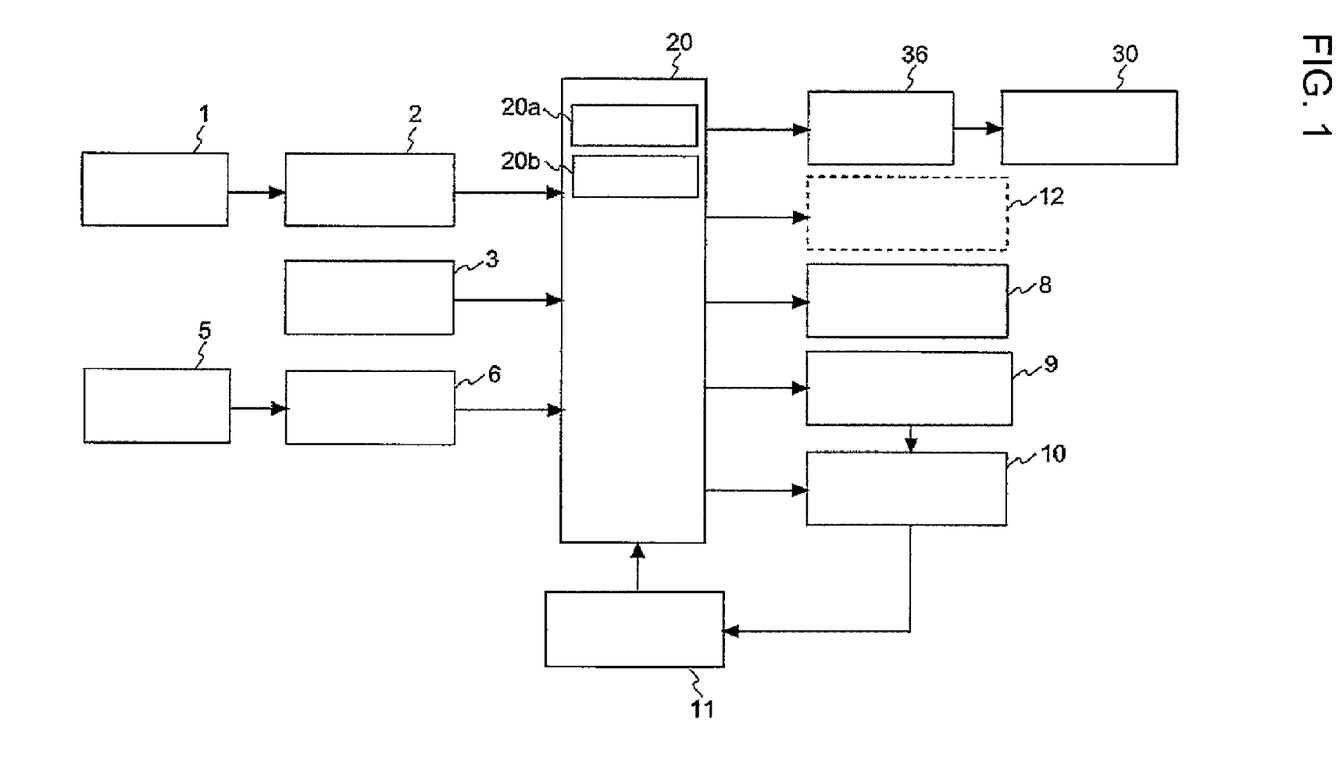
FIG. 1 is a schematic configuration diagram showing a control unit and peripheral units thereof according to an embodiment of the invention.
Figure 2:
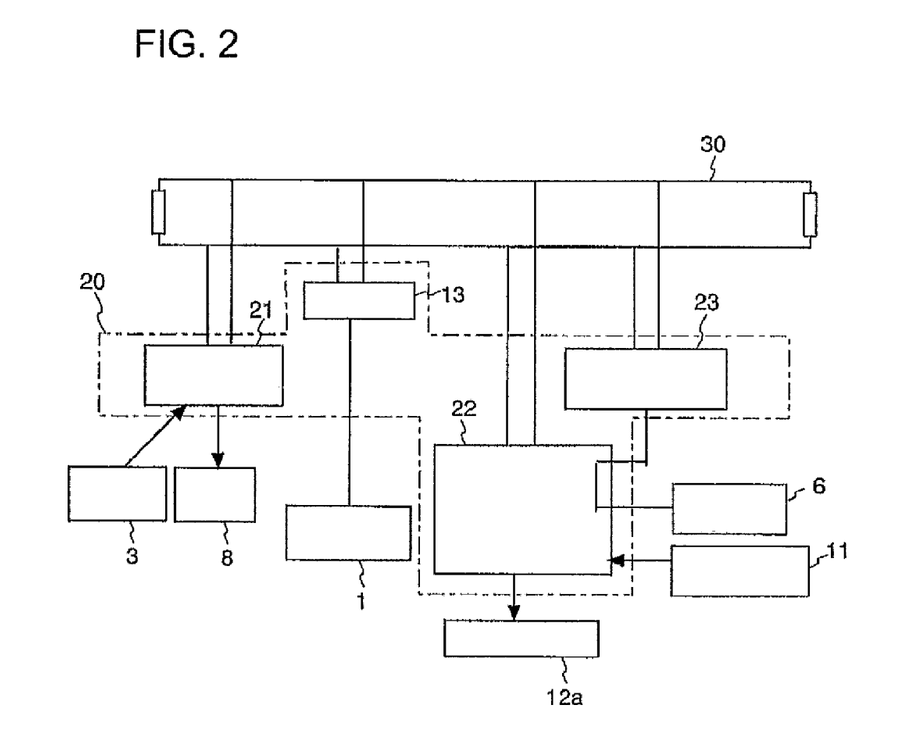
FIG. 2 is a configuration diagram showing an example of a distributed control unit according to the embodiment of the invention.
Figure 3:
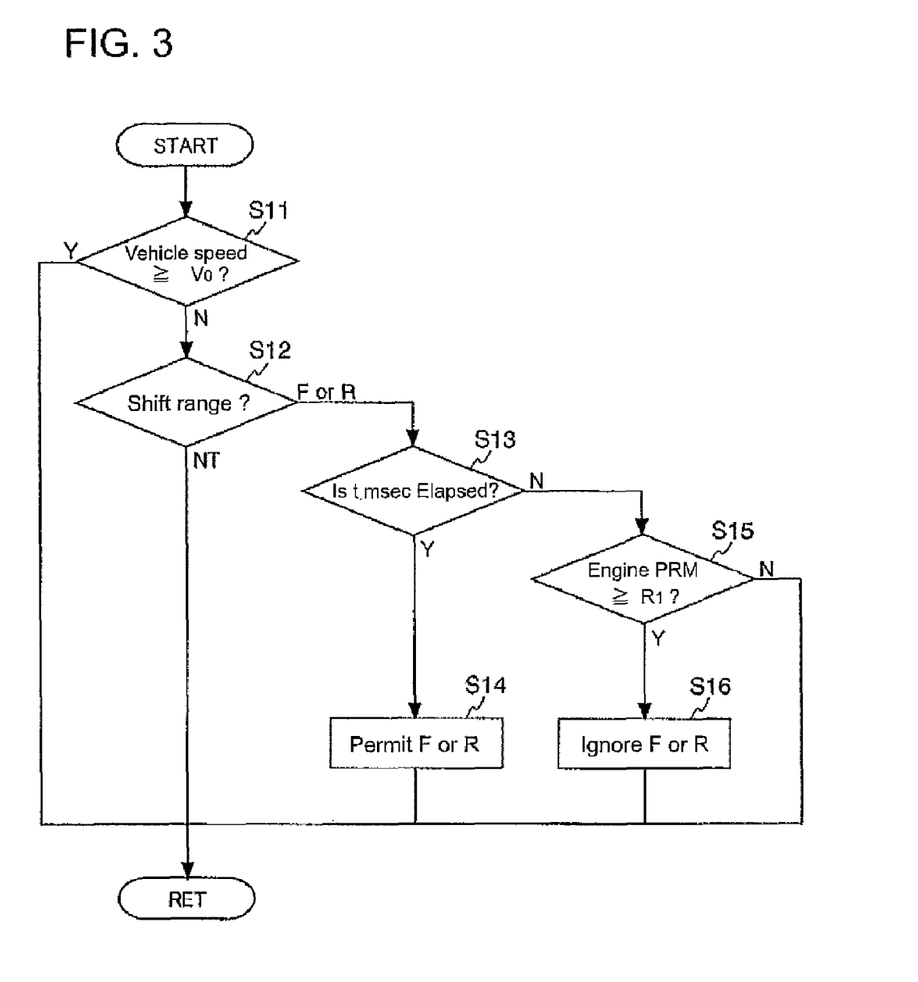
FIG. 3 is a flowchart showing the control unit according to the embodiment of the invention.
Figure 4:
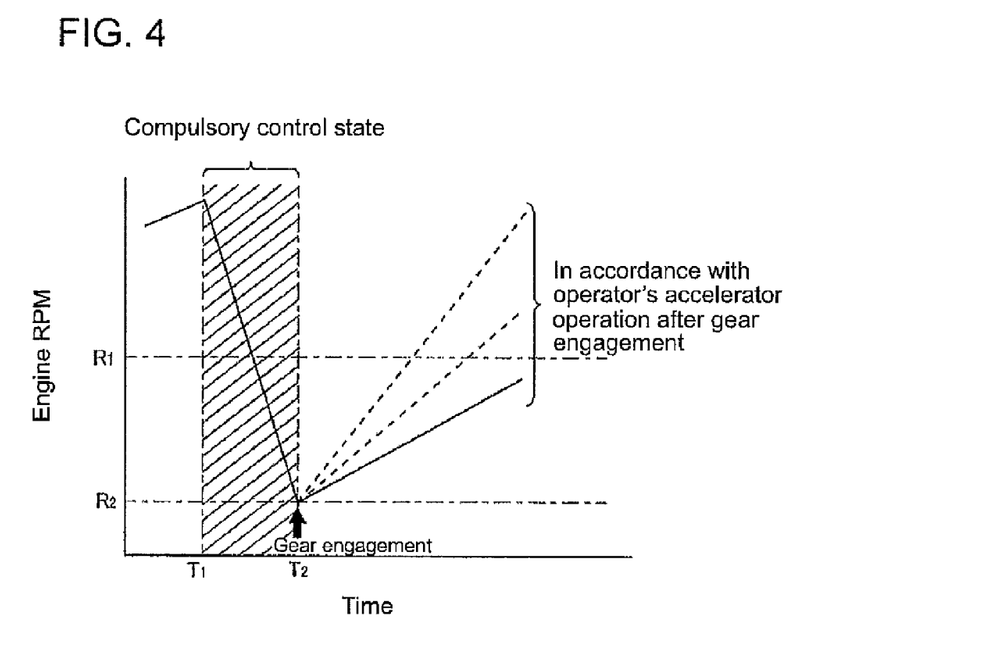
FIG. 4 is a diagram showing a first data table applied to the control unit according to the embodiment.
Figure 5:
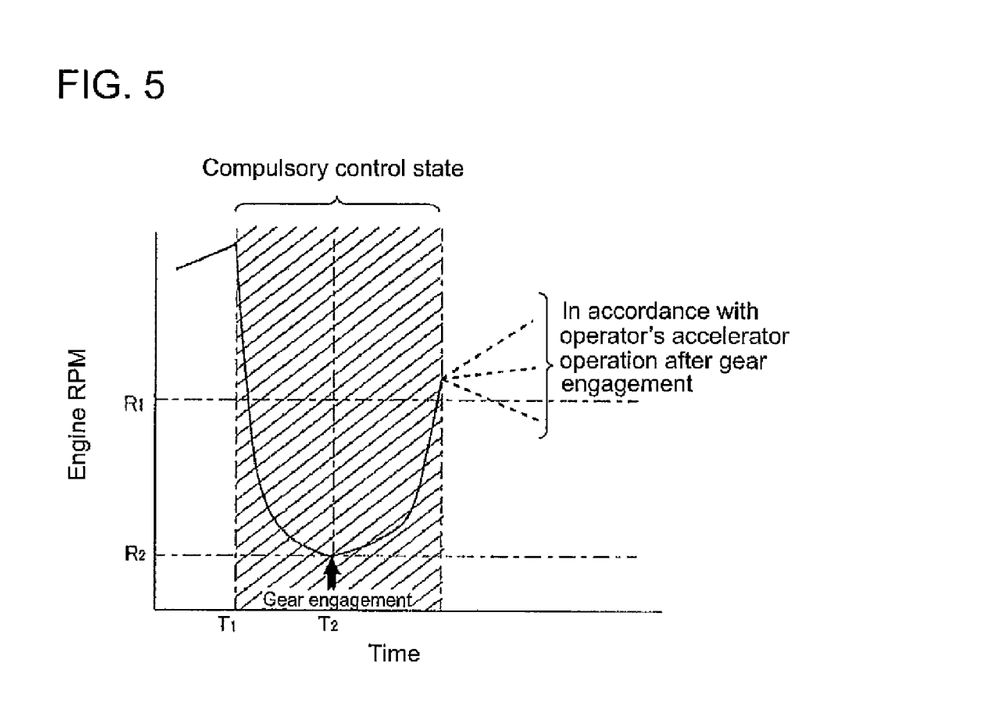
FIG. 5 is a diagram showing the first data table according to another example in FIG. 4.
Figure 6:
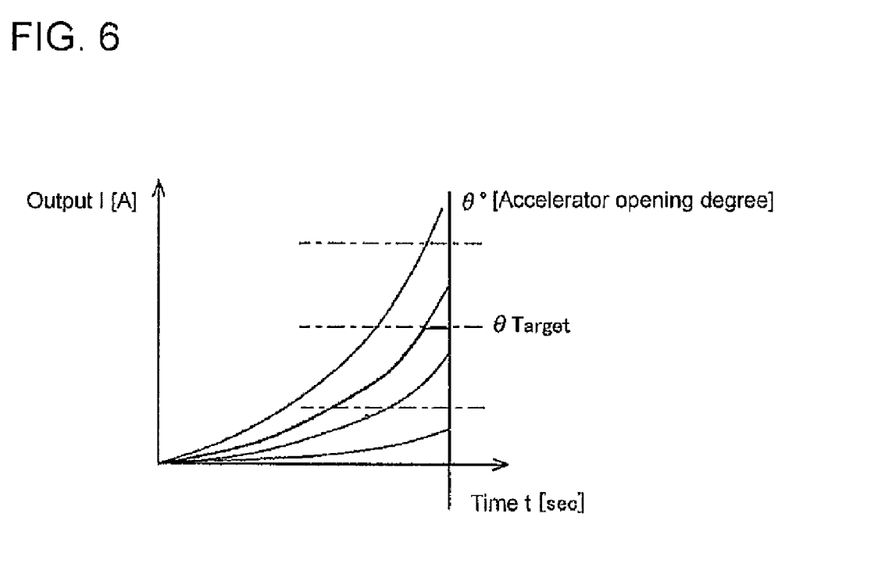
FIG. 6 is a diagram showing a second data table applied to the control unit according to the embodiment.
Figure 7:
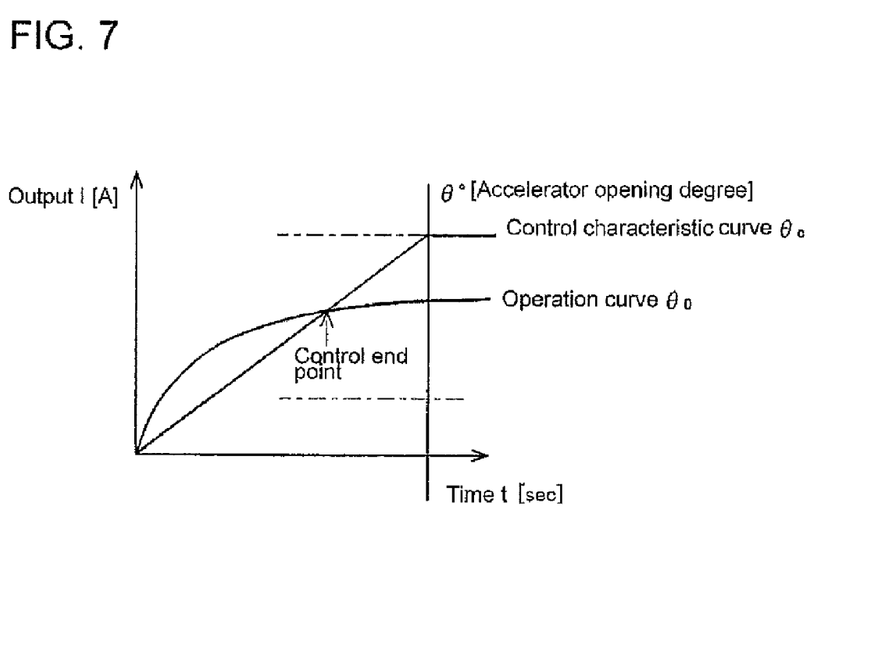
FIG. 7 is a diagram showing the second data table according to another example in FIG. 6.
Figure 8:
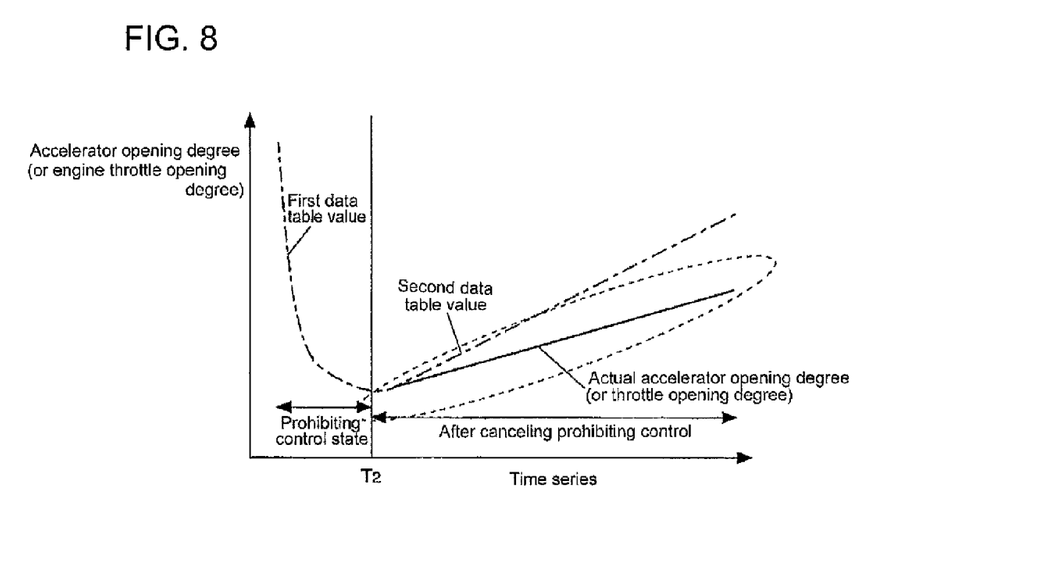
FIG. 8 is a diagram showing the second data table applied to the control unit according to the embodiment and showing a case where an accelerator pedal opening degree is smaller than the data table value upon canceling a prohibiting control.
Figure 9:
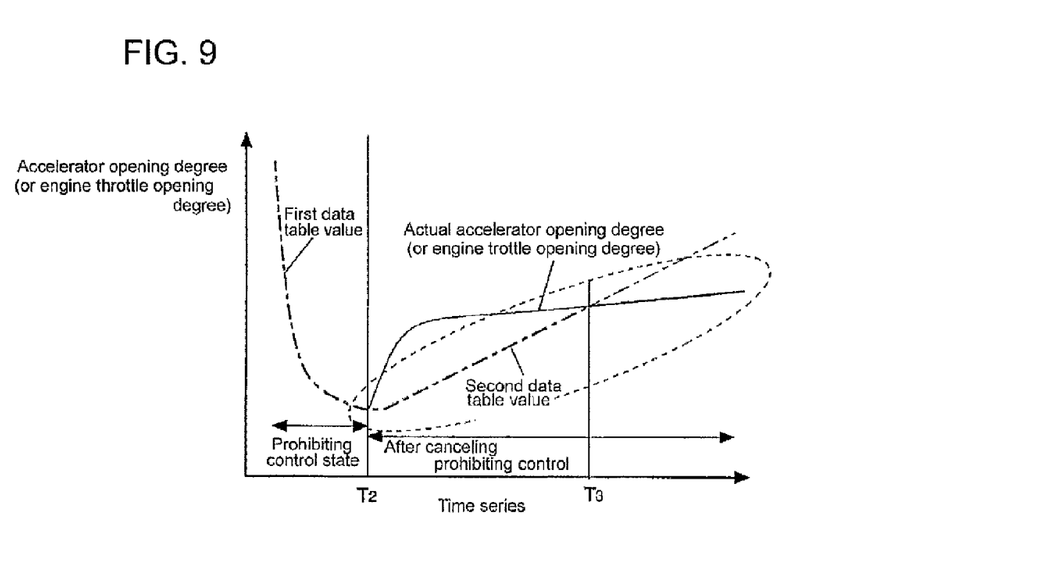
FIG. 9 is a diagram showing the second data table applied to the control unit according to the embodiment and showing a case where the accelerator pedal opening degree is larger than the data table value upon canceling the prohibiting control.
Figure 10:
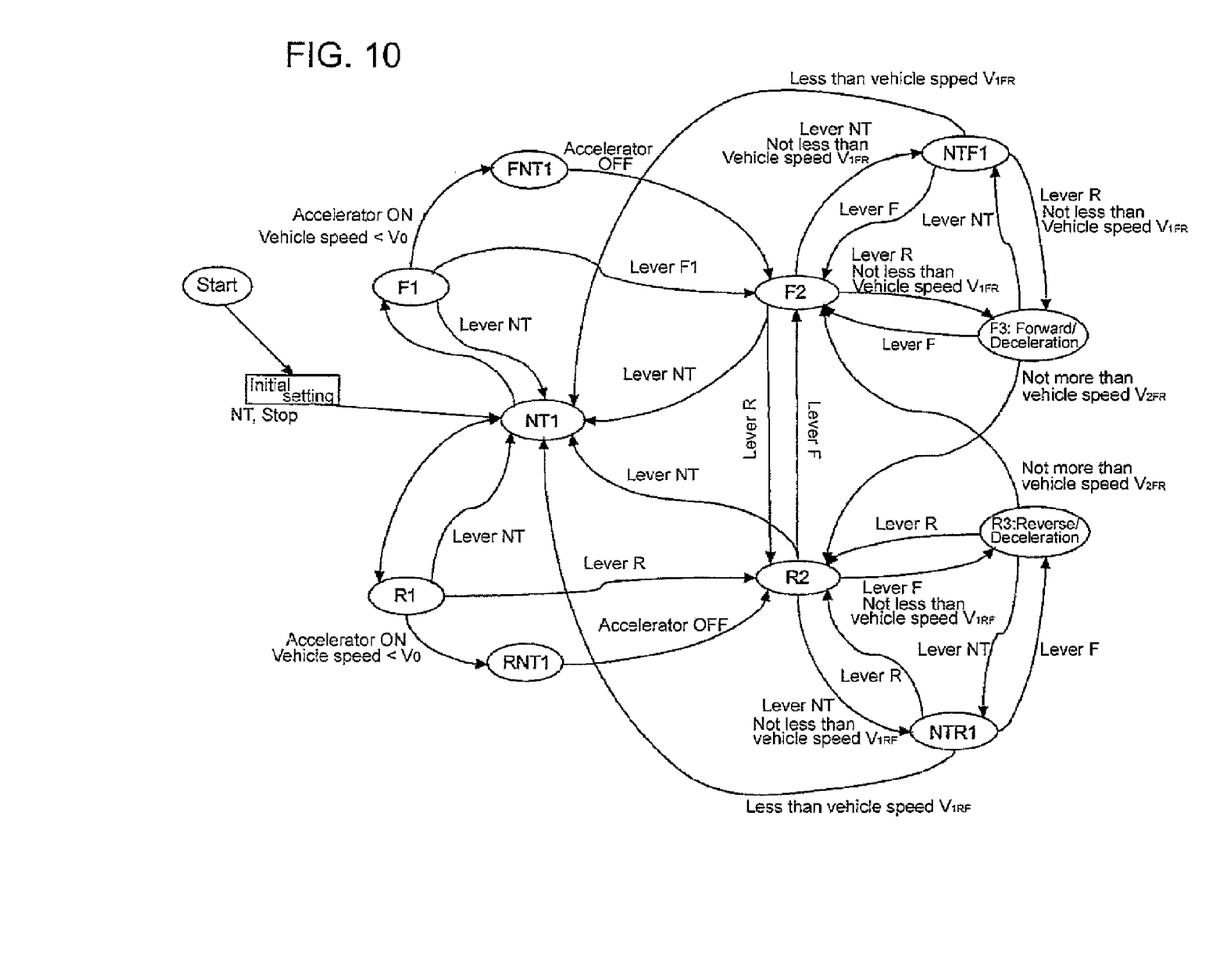
FIG. 10 is a state transition diagram showing an entire operation of a vehicle equipped with the control unit according to the embodiment of the invention.

FIG. 1 is a schematic configuration diagram showing a control unit and peripheral units thereof according to an embodiment of the invention. FIG. 2 is a configuration diagram showing an example of a distributed control unit according to the embodiment of the invention. FIG. 3 is a flowchart showing the control unit according to the embodiment of the invention. FIG. 4 is a diagram showing a first data table applied to the control unit according to the embodiment. FIG. 5 is a diagram showing the first data table according to another example in FIG. 4. FIG. 6 is a diagram showing a second data table applied to the control unit according to the embodiment. FIG. 7 is a diagram showing the second data table according to another example in FIG. 6. FIG. 8 is a diagram showing the second data table applied to the control unit according to the embodiment. FIG. 9 is a diagram showing the second data table applied to the control unit according to another example in FIG. 8. FIG. 10 is a state transition diagram showing an entire operation of a vehicle equipped with the control unit according to the embodiment of the invention.

In this embodiment, an automatic transmission realizing a forward one stage and a reverse one stage is shown as an example, but the invention may be applied to an automatic transmission having plural speed stages. The configuration according to this embodiment may be applied to various vehicles as well as a passenger vehicle, and more particularly, to an industrial vehicle represented as a cargo handling machine such as a forklift or a reach stacker and a construction machine such as a motor grader, a bulldozer, or a wheel loader.

By referring to FIG. 1, a schematic configuration of the control unit according to the embodiment will be described. A control unit 20 is configured as a computer including a CPU, a RAM, a ROM, and the like. The control unit controls an ON/OFF state of a hydraulic control electromagnetic valve (not shown) by controlling current supplied to a forward/reverse solenoid 8, and controls a shift change of the vehicle by operating a clutch. Additionally, the control unit 20 is connected to the engine 10, and mainly controls the engine rpm of the engine 10 by means of an engine rpm control unit 9 on the basis of an input from an accelerator pedal 5. Further, in this embodiment, a predetermined calculation process is carried out by the control unit 20 on the basis of the input signals obtained from a shift range detecting unit 2, a vehicle speed sensor 3, an engine rpm detecting unit 11, and the like as well as an accelerator opening degree detecting unit 6. The control signal based on the calculation result is supplied to the engine rpm control unit 9 so as to control the engine rpm of the vehicle.

Additionally, the control unit 20 is connected to a plurality of sensor groups for detecting various vehicle states, that is, at least the shift range detecting unit 2 for detecting a shift range selected by a shift operating unit 1 disposed in an operator's manipulation portion and the vehicle speed sensor 3 for detecting a vehicle speed, and an engine rpm detecting unit 11 for detecting an engine rpm of the engine 10.

Here, the shift operating unit 1 is operated by the operator, and is a unit for setting a desired shift range, the unit being, for example, a shift lever, a shift switch, or the like. The shift range detecting unit 2 detects a shift range position selected by the shift operating unit 1 and outputs a shift range detecting signal to the control unit 20.

The accelerator opening degree detecting unit 6 detects the accelerator opening degree (pressing amount) of the accelerator pedal 5 operated by an operator and outputs the detected opening degree to the control unit 20. The control unit 20 stores information used for obtaining an output value to be output to a proportional valve or the like (not shown) in accordance with the accelerator pedal opening degree. On the basis of the stored information, the control unit 20 controls the rpm of the engine 10 by controlling an output supplied to the proportional valve for controlling the throttle valve of the engine 10 in accordance with the detection signal obtained from the accelerator opening degree detecting unit 6. Additionally, the engine rpm detected by the engine rpm detecting unit 11 is configured to be output to the control unit 20. Further, the accelerator pedal 5 includes an accelerator pedal and an accelerator switch, and is generally referred to as a throttle valve opening unit.

The control unit 20 controls the forward/reverse solenoid 8 to carry out a forward/reverse switching operation in a vehicle traveling direction in principle on the basis of the shift range detected by the shift range detecting unit 2. That is, the forward/reverse solenoid 8 is electrically connected to the control unit 20, and current supplied to the forward/reverse solenoid 8 is controlled on the basis of the control signal obtained from the control unit 20, thereby carrying out the forward/reverse switching operation in the vehicle traveling direction.

As described above, the engine rpm control unit 9 is a unit for controlling the rpm of the engine 10 on the basis of the calculation result calculated by the control unit 20 by means of the input signal obtained from the accelerator opening degree detecting unit 6 or the input signals obtained from the shift range detecting unit 2, the vehicle speed sensor 3, the engine rpm detecting unit 11, and the like. For example, the engine rpm control unit is configured as the proportional valve for controlling the throttle valve of the engine, and controls the opening degree of the proportional valve on the basis of the output signal obtained from the control unit 20 so as to control an amount of fuel supplied to an engine cylinder, thereby controlling the engine rpm.

The power of the engine 10 is transmitted to the transmission. After the forward/reverse switching operation in the vehicle traveling direction is carried out, the power of the engine 10 is transmitted to left and right drive wheels via a differential gear (not shown). The automatic transmission includes a forward clutch and a reverse clutch, and carries out the forward/reverse switching operation in the vehicle traveling direction by applying an operating hydraulic pressure to the clutches via an electromagnetic valve differentially operated by the forward/reverse solenoid 8.

In the control unit 20 having the above-described function, a calculation process for each of the plurality of different controlling portions is carried out. The control unit 20 may be integrally formed or may be separated for each controlling object. An example of the distributed control unit 20 which is separated for each controlling object is shown in FIG. 2.

The control unit 20 includes a vehicle control controller 21, a departure control controller 22, an engine control controller 23, and a meter panel 13, which are physically distanced from each other and are connected to each other via a communication line 30. Additionally, the shift lever (shift operating unit) 1 is connected to the communication line 30 via the meter panel 13.

The vehicle control controller 21 is connected to the vehicle speed sensor 3, the forward/reverse solenoid 8, and the like, and is a controller for carrying out a basic vehicle control except for an engine control, the controller carrying out, for example, a forward/reverse switching control.

As a characteristic configuration according to this embodiment, the departure control controller 22 is connected to the accelerator opening degree sensor 6, the engine rpm detecting unit 11, and the like, and is a controller for carrying out a control for coping with a case where an operator's erroneous operation is carried out upon carrying out a departure operation, the controller carrying out, for example, a control for ignoring the shift change in accordance with the erroneous operation or a control for compulsorily decreasing the engine rpm.

The engine control controller 23 is connected to the engine 10 (not shown), and is a controller for controlling the engine rpm during a normal traveling mode.

Additionally, it is desirable that the control unit 20 includes an alarm unit 12. The alarm unit 12 is a unit for generating an alarm to the operator or a third person in the vicinity of the vehicle. For example, in order to inform an erroneous shift change state or an action to be carried out by the operator to cancel a prohibiting control, a general meter display may be provided with an alarm display unit for performing a display, a voice alarm unit for generating an alarm by means of a voice, or an alarm lamp 12a for generating an alarm by turning on a lamp or turning on/off the lamp.

Next, by referring to the state transition diagram shown in FIG. 10, the entire operation of the vehicle equipped with the control unit according to this embodiment will be described. Additionally, the control unit 20 is operated in accordance with a control program storing the following controls in advance.

In FIG. 10, when the operator operates a start key in a vehicle stop state, a start ON state is detected. When the engine is started, the control unit is set in accordance with an initial setting in the vehicle stop state. At this time, the transmission is set to a neutral state (NT1).

When the operator operates the shift lever (shift operating unit) 1, the shift range detecting unit 2 detects a shift switching operation from a neutral N to a forward range F (hereinafter, referred to as "forward F") (F1), and then the engine rpm detecting unit 11 detects that the engine rpm is less than a predetermined value $R_1$ until a predetermined time t is elapsed, a control corresponding to a normal shift switching operation is carried out. That is, current is supplied to the forward solenoid of the forward/reverse solenoid 8 to be in an ON state. Subsequently, a forward clutch is engaged and a forward traveling mode of the vehicle is started in accordance with the accelerator pedal opening degree (pressing amount) detected by the accelerator opening degree detecting unit 6, thereby setting the control unit 20 to be in a normal forward traveling mode (F2).

Meanwhile, the vehicle speed sensor 3 detects a vehicle speed Vi and the vehicle speed is less than a reference vehicle speed $V_0$ ($V_0 > Vi \geq 0$ (km/h)), the shift range detecting unit 2 detects the shift switching operation from the neutral N to the forward F (F1). When a counting operation is carried out by means of a timer 20a (see FIG. 1) from the detection time point, and the engine rpm detecting unit 11 detects that the engine rpm is not less than a predetermined value $R_1$ until the timer counter value is equal to the predetermined time t, a control is carried out which prohibits the shift change in accordance with the shift switching operation detected by the shift range detection unit 2 (FNT1). That is, the current is not supplied to the forward solenoid, and the forward solenoid is maintained to be in an OFF state (at this time, the reverse solenoid is maintained to be in an OFF state). Accordingly, the shift range detected by the shift range detecting unit 2 is located at the forward F, but the transmission is in a neutral state where the gear is not engaged. Additionally, the reference vehicle speed $V_0$ is, for example, a speed which is not detected by the vehicle speed sensor. It is desirable that the $V_0$ is set to a speed at which the vehicle is regarded to be in a stop sate and an average movement value of a sensor detection speed is regarded to be 0 (km/h) for a predetermined time. For example, the vehicle speed $V_0$ is set to an arbitrary speed between 1 to several km/h and 0 (km/h).

Further, here, a configuration is shown in which the engine rpm is directly detected by the engine rpm detecting unit 11 and the above-described control is carried out on the basis of the engine rpm, but a configuration may be provided in which the engine rpm is indirectly detected. For example, a configuration may be provided in which a control is carried out on the basis of the accelerator pedal opening degree (opening degree (pressing amount)) detected by the accelerator opening degree detecting unit 6. Since the accelerator pedal opening degree is involved with the engine rpm, it is possible to carry out the same control as the above-described control. That is, when a predetermined value $P_1$ of the accelerator pedal opening degree is set in advance and the accelerator pedal opening degree detected by the accelerator opening degree detecting unit 6 is not less than the predetermined value $P_1$, a control is carried out which prohibits the shift change in accordance with the shift range detected by the shift range detecting unit 2 (FNT1). Hereinafter, an example is shown in which an input parameter such as the engine rpm is directly used in the respective control conditions, but an input parameter such as the accelerator pedal opening degree involved with the engine rpm may be used as the control condition.

When the engine rpm detecting unit 11 detects that the engine rpm is not more than a predetermined value $R_2$ after carrying out the shift change prohibiting control (FNT1), a control is carried out which cancels the prohibiting control. The canceling control is to permit the shift change of the transmission in accordance with the shift switching operation of the shift lever 1. That is, here, the forward solenoid is made to be in an ON state, and the forward clutch is made to be in an engagement state, thereby setting the normal forward traveling mode (F2).

The predetermined engine rpm value $R_2$ as the prohibiting control canceling condition is set to be equal or smaller than the predetermined value $R_1$ as the prohibiting control starting condition. It is desirable that the predetermined values are different so that the predetermined value $R_1$>the predetermined value $R_2$. Accordingly, it is possible to carry out a stable driving by preventing hunting.

In the same manner, when the shift range detecting unit 2 detects the shift switching operation from the neutral N to the reverse range R (hereinafter, referred to as "reverse R") (R1) after starting the vehicle and the engine rpm detecting unit 11 detects that the engine rpm is less than the predetermined value $R_1$ until a time t is elapsed from the detection time point, a control corresponding to the normal shift change is carried out, thereby setting a normal reverse traveling mode (R2).

Meanwhile, when the vehicle speed sensor 3 detects the vehicle speed, the shift range detecting unit 2 detects the shift switching operation from the neutral N to the reverse R (F1) at a vehicle speed less than the reference vehicle speed $V_0$ (including a case where $V_0=0$) indicating a vehicle stop state, and then the engine rpm detecting unit 11 detects that the engine rpm is not less than the predetermined value $R_1$ until a predetermined time t is elapsed from the detection time point, a control is carried out which prohibits the shift change in accordance with the shift range detected by the shift range detecting unit 2 (RNT1). That is, the current is not supplied to the reverse solenoid, and the reverse solenoid is maintained to be in an OFF state (at this time, the forward solenoid is in an OFF state). Accordingly, the shift range detected by the shift range detecting unit 2 is located at the reverse R, but the transmission is in the neutral state where the gear is not engaged.

When the engine rpm detecting unit 11 detects that the engine rpm is not more than the predetermined value $R_2$ after carrying out the switching prohibiting control (RNT1), a control for canceling the prohibiting control is carried out.

That is, the current supply to the reverse solenoid is started to be in an ON state, and the reverse clutch is made to be in an engagement state, thereby setting the reverse traveling mode (R2).

Additionally, the reference vehicle speed $V_0$ may be equal to or different from the reference vehicle speed $V_0$ in the forward traveling mode. Further, the predetermined values $R_1$ and $R_2$ of the engine rpm may be equal to or different from the predetermined values $R_1$ and $R_2$ in the forward traveling mode.

Furthermore, when a shift lever is returned to the neutral N in a state where the shift operation is carried out to the forward F (F1) or the reverse R (R1) in the vehicle starting mode, a normal neutral state (NT1) is carried out.

According to this embodiment, in a case where the shift switching operation causing a large load is carried out at a high engine rpm upon carrying out the departure operation, it is possible to prevent a high shock from being applied to the transmission, the front axle, or the like by carrying out a control for prohibiting the shift change of the transmission. Additionally, since it is possible to determine the vehicle stop state on the basis of the vehicle speed, such functions are configured to be carried out only in the vehicle stop state, thereby accurately preventing inconvenience upon carrying out the departure operation. Further, according to this embodiment, since the predetermined time t is set in advance and the shift change is prohibited within the predetermined time t even when the accelerator pedal is operated, it is possible to allow the operator to be accustomed to operate the accelerator pedal after a predetermined time from the operator's shift operation, thereby reliably preventing the breakdown of the vehicle.

Subsequently, when the vehicle speed sensor 3 detects that the vehicle speed is not less than the predetermined vehicle speed $V_1$ and the shift range detecting unit 2 detects that the shift switching operation is carried out to the reverse R in a state where the vehicle travels in a normal forward traveling mode (F2), the control unit 20 ignores the shift change of the transmission to the reverse R and carries out a deceleration traveling control by means of the deceleration unit (F3). That is, the forward solenoid is made to be in an ON state (the reverse solenoid is in an OFF state) on the basis of the control signal obtained from the control unit 20. At the same time, the control unit 20 outputs a control signal for operating the deceleration unit so as to compulsorily decrease the vehicle speed. At this time, the shift lever 1 is located at the reverse R, but the transmission is located at the forward in a state where the forward gear is engaged.

The deceleration unit is configured as an engine brake, an electromagnetic-control-type hydraulic brake, or a combination thereof, and is a unit for compulsorily decreasing the engine rpm.

When the vehicle speed sensor 3 detects that the vehicle speed is not more than the predetermined vehicle speed $V_2$ after carrying out the traveling control (F3), the shift change to the reverse R is permitted, thereby setting a normal reverse traveling mode (R2). That is, when the detected vehicle speed is not more than the vehicle speed $V_2$, the forward solenoid is made to be in an OFF state and the reverse solenoid is made to be in an ON state.

Additionally, when the vehicle speed sensor 3 detects that the vehicle speed is not less than the predetermined vehicle speed $V_1$ and the shift range detecting unit 2 detects that the shift switching operation is carried out to the neutral N in a state where the vehicle travels in the normal forward traveling mode (F2), the forward solenoid is made to be in an OFF state (the reverse solenoid is in an OFF state), and the clutch of the transmission is opened to be in the neutral state (NTF1). Further, when the vehicle speed is not less than the predetermined vehicle speed $V_1$ in a state where the selector 1 is switched to the reverse R in this state, the above-described traveling control (F3) is carried out.

When the shift range detecting unit 2 detects that the shift lever 1 is returned to the forward F during the above-described traveling control (F3), the normal forward traveling mode (F2) is carried out.

In the same manner, when the vehicle speed sensor 3 detects that the vehicle speed is not less than the predetermined vehicle speed $V_1$ and the shift range detecting unit 2 detects that the shift switching operation is carried out to the forward F in a state where the vehicle travels in the normal reverse traveling mode (R2), the control unit 20 ignores the shift change to the forward F and the deceleration traveling control is carried out by the deceleration unit (R3). That is, the reverse solenoid is maintained to be in an ON state (the forward solenoid is in an OFF state) on the basis of the control signal obtained from the control unit 20. At the same time, the control unit 20 outputs a control signal for operating the deceleration unit to compulsorily decrease the vehicle speed. At this time, the shift lever 1 is located at the forward F, but the transmission is located at the reverse to carry out the reverse traveling mode.

When the vehicle speed sensor 3 detects that the vehicle speed is not more than the predetermined vehicle speed $V_2$ after carrying out the above-described traveling control (R3), the shift change to the forward F is permitted to carry out the normal forward traveling mode (F2). That is, when the detected vehicle speed is not more than the vehicle speed $V_2$, the reverse solenoid is in an OFF state, and the forward solenoid is in an ON state, thereby carrying out the forward traveling mode.

Additionally, when the vehicle speed sensor 3 detects that the vehicle speed is not less than the predetermined vehicle speed $V_1$ and the shift range detecting unit 2 detects that the shift switching operation is carried out to the neutral N in a state where the vehicle travels in the normal reverse traveling mode (R2), the reverse solenoid is made to be in an OFF state (the forward solenoid is in an OFF state), and the clutch of the transmission is opened to be in the neutral state (NTR1). Additionally, when the vehicle speed is not less than the predetermined vehicle speed $V_1$ in a state where the shift lever 1 is switched to the forward F in this state, the above-described traveling control (F3) is carried out.

When the shift range detecting unit 2 detects that the shift lever 1 is returned to the reverse R during the above-described traveling control (F3), the normal reverse traveling mode (R2) is carried out.

Here, the configuration of this embodiment will be described in detail with reference to FIGS. 3 to 7.

In this embodiment, when the shift range detecting unit 2 detects that the shift switching operation of the shift lever 1 is carried out from the neutral N to the forward F or the reverse R and the engine rpm is not less than the predetermined value in the vehicle stop state, a control is carried out which prohibits the shift change of the transmission in accordance with the shift switching operation.

That is, as shown in FIG. 3, the control unit 20 determines whether the vehicle speed detected by the vehicle speed sensor 3 is not less than the predetermined reference vehicle speed $V_0$ (km/h) (S11). Then, when the detected vehicle speed is less than the reference vehicle speed $V_0$, the shift range detecting unit 2 determines the detected shift range (S12). In a case where the shift range is located at the forward F or the reverse R, it is determined whether the predetermined setting time t (msec) is elapsed. When the setting time t is elapsed, the switching operation (shift change) to the forward F or the reverse R is permitted in accordance with the detected shift range (S14).

Meanwhile, when the predetermined time t is not elapsed, it is determined whether the engine rpm detected by the engine rpm detecting unit 11 is not less than the predetermined value $R_1$ (S15). When the detected engine rpm is not less than the predetermined value $R_1$, the shift switching operation and the accelerator pedal pressing operation are carried out at the substantially same time or the accelerator pedal pressing operation is first carried out by the operator's erroneous operation. Then, a control is carried out which prohibits the shift change by ignoring the forward F or the reverse R (S16).

According to this embodiment, since the vehicle stop state is determined on the basis of the vehicle speed and the gear engagement is prevented at the high engine rpm, it is possible to prevent the breakdown of the transmission, the front axle, or the like. Additionally, since the above-described function is carried out only in the vehicle stop state, it is possible to prevent inconvenience upon carrying out the departure operation.

According to this embodiment, since the predetermined time t is set in advance and the shift change is prohibited even when the accelerator pedal operation is carried out within the predetermined time t, it is possible to allow the operator to be accustomed to operate the accelerator pedal after a predetermined time from the operator's shift operation, and thus to reliably prevent the breakdown of the vehicle.

Additionally, as shown in FIG. 4, when the engine rpm is not more than the predetermined value $R_2$ (see FIG. 7) during the above-described prohibiting control, the prohibiting control is canceled and the shift change of the transmission in accordance with the shift switching operation is carried out. It is desirable that the predetermined engine rpm $R_2$ is the rpm during an idle rotation. After the shift change, the engine rpm is controlled in accordance with the operator's accelerator pedal operation (an input signal obtained from an engine rpm control unit 4).

Accordingly, since the gear engagement is carried out at a time point when the engine rpm decreases, it is possible to prevent a large load and to carry out a control in accordance with the operator's operation.

Additionally, the predetermined engine rpm $R_2$ as the prohibiting control canceling condition is desirably set so that the predetermined value $R_1$>the predetermined value $R_2$. Accordingly, it is possible to carry out the stable driving by preventing the hunting.

Further, it is desirable to provide the function activating alarm unit 12 (see FIG. 1) for generating an alarm to the operator or the third person in the vicinity of the vehicle during the above-described prohibiting control. An example of the alarm unit 12 includes a method of turning on an alarm lamp provided in a driver seat of the vehicle, a method of generating an alarm buzzer, or a method of performing a screen display. The alarm unit 12 informs the operator or the third person that the prohibiting control is currently carried out or informs the operator of the subsequent operation to be carried out.

Likewise, since the alarm is generated when the erroneous operation is carried out, it is possible for the operator or the third person in the vicinity of the vehicle to accurately check the vehicle state, and thus to promptly carry out the appropriate driving operation.

According to this embodiment, a configuration may be provided in which the engine rpm is compulsorily decreased by the engine rpm control unit 9 during the prohibiting control. Accordingly, when it is recognized that the above-described prohibiting control is carried out by the control unit 20, the control unit 20 sends an electric control signal for decreasing the engine rpm to the engine rpm control unit 9, and the engine rpm control unit 9 is operated to decrease the engine rpm. Thus, it is possible to reduce a time until the control corresponding to the shift switching operation is carried out, and thus to carry out the prompt driving control.

Additionally, when the engine rpm decreases during the above-described prohibiting control, it is desirable to carry out the following. The control unit 20 includes a first control data table set in advance in which an engine rpm time-series control pattern for compulsorily decreasing the engine rpm during the above-described prohibiting control, and carries out a control for decreasing the engine rpm in accordance with the first control data table during the above-described prohibiting control. The control may be carried out so that the engine rpm decreases in accordance with a linear engine rpm control pattern shown in FIG. 4 or the engine rpm decreases in accordance with a control pattern having a smooth control characteristic curve shown in FIG. 5. Additionally, as shown in the same drawing, the control unit 20 may include a second control data table having a control characteristic curve in which the shift change in accordance with the shift switching operation is carried out to engage the gear when the engine rpm decreases down to a value not more than the predetermined value $R_2$, and the engine rpm increases up to a predetermined engine rpm. In this case, the engine rpm is controlled in accordance with the operator's accelerator pedal operation when a predetermined time is elapsed from the acceleration. Additionally, in the second control data table, the engine rpm control pattern after canceling the prohibiting control is set, which will be described below.

Further, according to this embodiment, when the shift range detecting unit 2 detects the shift switching operation at a vehicle speed less than the reference vehicle speed $V_0$ and the accelerator opening degree detecting unit 6 outputs an input signal for instructing the engine rpm not less than the predetermined value $R_1$ until a predetermined time t is elapsed from the shift switching operation, the control unit 20 may delay the input signal obtained from the accelerator opening degree detecting unit 6 for a predetermined time t and may output the input signal to the engine rpm control unit 9. In general, it is desirable that the operator operates the accelerator pedal after operating the shift lever 1. However, even when the shift operation and the accelerator pedal operation are carried out at the substantially same time or the accelerator pedal operation is first carried out, according to this embodiment, since the accelerator pedal operation is input after reliably carrying out the shift operation, it is possible to carry out the stable departure operation.

An example of the configuration is shown as below.

The input signal obtained from the accelerator opening degree detecting unit 6 is not output until the predetermined time t, and the input signal obtained from the opening degree detecting unit 6 is activated to carry out the engine rpm control after the predetermined time t. Since the input signal obtained from the engine rpm control unit 4 is different from the actual engine rpm upon activating the input signal, it is desirable to increase the engine rpm in accordance with the second control data table included in the control unit 20. The second control data table includes a time-series speed pattern as an engine rpm increase target after canceling the prohibiting control. Specifically, the table shown in FIG. 6 or 7 is used. Additionally, in the drawings, an engine output 1 is adopted instead of the engine rpm.

As shown in FIG. 6, a plurality of data tables is provided in accordance with the accelerator pedal opening degree signal (the input signal obtained from the engine rpm control unit), and when the accelerator pedal opening degree increases up to a predetermined accelerator pedal opening degree $\theta_{Target}$, the control ends. At this time, the gear engagement may be slowly carried out. Additionally, when a predetermined control characteristic curve $\theta_c$ and an operation curve $\theta_0$ in accordance with the operator's intension exist as shown in FIG. 7, the control may end at a time point when the control characteristic curve $\theta_c$ exceeds the operation curve $\theta_0$. A control in accordance with the operator's intension is carried out after ending the control.

Further, another example of the configuration is shown as below.

The input signal (i.e., the opening degree signal obtained from the accelerator opening degree detecting unit 6 of the accelerator pedal 5) is not output from the engine rpm control unit 4 until the predetermined time t, and the input signal obtained from the engine rpm control unit 4 is activated after the predetermined time t to thereby carry out the engine rpm control in accordance with the input signal. Further, in this configuration, there is provided a delay circuit 20b (which may be provided in the control unit 20 shown in FIG. 1 and may be provided in the front stage of the engine rpm control unit 9) so that the input signal (i.e., the opening degree signal obtained from the accelerator opening degree detecting unit 6 of the accelerator pedal 5) is stored until the predetermined time t and the engine rpm is controlled to be delayed in accordance with a history of the stored input signal.

Accordingly, even when the accelerator pedal operation and the shift switching operation are carried out at the same time or the accelerator pedal operation is first carried out, the control according to this embodiment is smoothly carried out.

Additionally, another configuration using the second control data table is shown as below.

The control unit 20 includes the second control data table set in advance and having the time-series control pattern of the engine rpm after a timing at which the prohibiting control is canceled. When the engine rpm corresponding to the accelerator pedal opening degree operated by the operator after a timing at which the prohibiting control is canceled is larger than the engine rpm set in the second control data table, the engine rpm is controlled to be equal to the engine rpm set in the second data table. When the engine rpm corresponding to the accelerator pedal opening degree operated by the operator after a timing at which the prohibiting control is canceled is not more than the engine rpm set in the second control data table, the engine rpm is controlled to be equal to the engine rpm corresponding to the accelerator pedal opening degree operated by the operator.

The second data table is shown in FIGS. 8 and 9. FIG. 8 shows a case where the accelerator pedal opening degree is smaller than the data table value upon canceling the prohibiting control, and FIG. 9 shows a case where the accelerator pedal opening degree is larger than the data table value upon canceling the prohibiting control.

As shown in FIG. 8, the accelerator pedal opening degree or the engine throttle opening degree decreases in accordance with the first control data table during the prohibiting control, and the second control data table is selected at a timing $T_2$ at which the prohibiting control is canceled. At this time, the second control data table value is compared with the actual engine throttle opening degree or the actual accelerator pedal opening degree corresponding to the accelerator pedal opening degree operated by the operator. When the actual accelerator pedal opening degree or the actual engine throttle opening degree is smaller than the second control data table value, the engine rpm is controlled to be equal to the engine rpm corresponding to the operator's accelerator pedal pressing amount.

On the other hand, as shown in FIG. 9, the accelerator pedal opening degree or the engine throttle opening degree decreases in accordance with the first control data table during the prohibiting control, and the second control data table is selected at a timing $T_2$ at which the prohibiting control is canceled. At this time, the second control data table value is compared with the actual engine throttle opening degree or the actual accelerator pedal pressing amount corresponding to the accelerator pedal opening degree operated by the operator. When the actual accelerator pedal opening degree or the actual engine throttle opening degree is larger than the second control data table value, the engine rpm is controlled to be equal to the engine rpm set by the second data table. Then, the control is switched at a time point $T_3$ at which the second data table value is larger than the actual value, and the engine rpm is controlled to be equal to the engine rpm corresponding to the operator's accelerator pedal pressing amount.

According to this embodiment, since it is possible to control the vehicle at the appropriate engine rpm after canceling the prohibiting control, it is possible to reduce a load applied to the vehicle and to ensure a stable driving. For example, when the prohibiting control is directly canceled in a state where the operator's accelerator pedal pressing amount is large, the gear is engaged in a state where the accelerator pedal pressing amount is large and the accelerator pedal operation is permitted. Accordingly, in a case where the engine rpm is larger than the second control data table, it is possible to move to a normal driving state in a stable manner without deteriorating a driving feeling by controlling the engine rpm on the basis of the second control data table. On the other hand, in a case where the engine rpm corresponding to the accelerator pedal opening degree is not more than that of the second control data table, since it is possible to ensure the safety and the driving feeling without carrying out the above-described control, the control in accordance with the operator's operation is carried out.

INDUSTRIAL APPLICABILITY

According to this embodiment, since it is possible to reduce a risk inducing the breakdown of the vehicle caused by the operator's erroneous operation upon carrying out the departure operation in a vehicle stop state, the invention is applicable to various vehicles including the passenger vehicle, and more particularly, to the whole cargo handling industrial vehicle such as the forklift in which the stop/forward/reverse switching operation is frequently carried out.

The invention claimed is:

1. A vehicle control unit for controlling a vehicle on the basis of a detection signal obtained from a shift range detecting unit configured to detect a shift range selected by a shift operating unit, a vehicle speed detecting unit configured to detect a vehicle speed, and an engine rpm detecting unit configured to directly or indirectly detect an engine rpm,
   wherein when the vehicle speed detecting unit detects that a vehicle speed Vi is less than a reference vehicle speed $V_0$ ($V_0 > Vi \geqq 0$ (km/h)), the shift range detecting unit detects that a shift switching operation is carried out from a neutral to a forward range or a reverse range, and then the engine rpm detecting unit detects that the engine rpm is not less than a predetermined value $R_1$ until a time not less than a predetermined time t is elapsed from a time point when the shift switching operation is detected, a control for prohibiting a shift change of a transmission in accordance with the shift switching operation is carried out,
   wherein when the engine rpm detecting unit detects that the engine rpm is not more than a predetermined value $R_2$ during the prohibiting control, the prohibiting control is canceled and the shift change in accordance with the shift switching operation is carried out,
   wherein a control signal for compulsorily decreasing the engine rpm to be not more than the predetermined value $R_2$ is transmitted to an engine rpm control unit provided in the vehicle during the prohibiting control,
   wherein a first control data table has an engine rpm time-series control pattern set in advance to compulsorily decrease the engine rpm during the prohibiting control, and
   wherein the engine rpm is controlled to decrease in accordance with the first control data table during the prohibiting control.

2. The vehicle control unit according to claim 1, wherein the predetermined value $R_1$ as a control starting condition of the prohibiting control and the predetermined value $R_2$ as a control canceling condition of the prohibiting control are set to be different from each other, and the predetermined value $R_2$ is smaller than the predetermined value $R_1$.

3. An industrial vehicle comprising:
the vehicle control unit according to claim 2.

4. The vehicle control unit according to claim 1, wherein an alarm unit is operated to generate an alarm toward an operator during the prohibiting control.

5. An industrial vehicle comprising:
the vehicle control unit according to claim 4.

6. An industrial vehicle comprising:
the vehicle control unit according to claim 1.

7. The vehicle control unit according to claim 1, wherein a second control data table has an engine rpm time-series control pattern after a prohibiting control canceling timing set in advance, and
   wherein when the engine rpm corresponding to an accelerator pedal opening degree (pressing amount) operated by the operator after the prohibiting control canceling timing is larger than the engine rpm set in the second control data table, the engine rpm is controlled to be equal to the engine rpm set in the second data table, and
   wherein when the engine rpm corresponding to the accelerator pedal opening degree operated by the operator after the prohibiting control canceling timing is not more than the engine rpm set in the second control data table, the engine rpm is controlled to be equal to the engine rpm corresponding to the accelerator pedal opening degree operated by the operator.

8. An industrial vehicle comprising:
the vehicle control unit according to claim 7.

* * * * *